(12) United States Patent
Bretschneider et al.

(10) Patent No.: US 11,898,616 B2
(45) Date of Patent: Feb. 13, 2024

(54) VIBRATION DAMPING SYSTEM AND MACHINE TOOL

(71) Applicant: Siemens Aktiengesellschaft, Munich (DE)

(72) Inventors: Jochen Bretschneider, Owingen (DE); Elmar Schäfers, Fürth (DE); Torsten Schür, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 283 days.

(21) Appl. No.: 17/355,980

(22) Filed: Jun. 23, 2021

(65) Prior Publication Data
US 2021/0404530 A1    Dec. 30, 2021

(30) Foreign Application Priority Data
Jun. 24, 2020  (EP) .................................... 20182022

(51) Int. Cl.
*F16F 15/00* (2006.01)
*B23Q 15/12* (2006.01)

(52) U.S. Cl.
CPC ............ *F16F 15/002* (2013.01); *B23Q 15/12* (2013.01)

(58) Field of Classification Search
CPC ........................... B23Q 11/0039; F16F 15/002
See application file for complete search history.

(56) References Cited

U.S. PATENT DOCUMENTS

| 4,636,779 A | * | 1/1987 | Thomas | B23Q 17/0971 73/104 |
| 4,636,780 A | * | 1/1987 | Thomas | B23Q 17/0971 73/104 |
| 6,296,093 B1 | * | 10/2001 | Norris | G05D 19/02 409/141 |
| 8,044,629 B2 | * | 10/2011 | Fallahi | F16F 7/1005 318/116 |
| 9,221,143 B2 | * | 12/2015 | Inagaki | B23Q 11/0039 |
| 9,636,936 B2 | * | 5/2017 | Neeb | B41J 29/26 |
| 11,254,007 B2 | * | 2/2022 | Yoshino | B25J 13/087 |
| 2009/0224444 A1 | * | 9/2009 | Mayama | F16F 15/0275 250/492.1 |

(Continued)

FOREIGN PATENT DOCUMENTS

DE  102004016731 A1  10/2005
DE  102017212276 A1   1/2018
(Continued)

*Primary Examiner* — Long T Tran
(74) *Attorney, Agent, or Firm* — Henry M. Feiereisen LLC

(57) ABSTRACT

A machine tool includes a machine element, an active vibration damper arranged on a region of the machine tool for damping a vibration of the machine element, and a vibration sensor facility arranged to detect the vibration of the machine element at a first point and at a second point of the machine tool, with the vibration of the machine element to be detected being smaller at the second point than at the first point. The active vibration damper is designed to damp the vibration of the machine element as a function of a variation between a first actual value detected by the vibration sensor facility at the first point and a second actual value detected by the vibration sensor facility at the second point.

17 Claims, 2 Drawing Sheets

(56) References Cited

U.S. PATENT DOCUMENTS

| | | | |
|---|---|---|---|
| 2016/0380506 A1* | 12/2016 | Lowth | F16F 15/035 |
| | | | 310/51 |
| 2018/0021904 A1 | 1/2018 | Koike et al. | |
| 2018/0036848 A1* | 2/2018 | Stockburger | B23Q 1/25 |
| 2019/0162704 A1* | 5/2019 | Cheng | G01N 29/14 |
| 2019/0299349 A1 | 10/2019 | Soraluce | |
| 2021/0123830 A1* | 4/2021 | Cheng | G01M 13/00 |

FOREIGN PATENT DOCUMENTS

| | | |
|---|---|---|
| DE | 102016114418 A1 | 2/2018 |
| EP | 1 001 184 A2 | 5/2000 |
| EP | 3 017 911 A1 | 5/2016 |
| EP | 3 241 647 A1 | 11/2017 |
| EP | 3 511 112 A1 | 7/2019 |
| EP | 3594392 A1 | 1/2020 |
| EP | 3 715 049 A1 | 9/2020 |

* cited by examiner

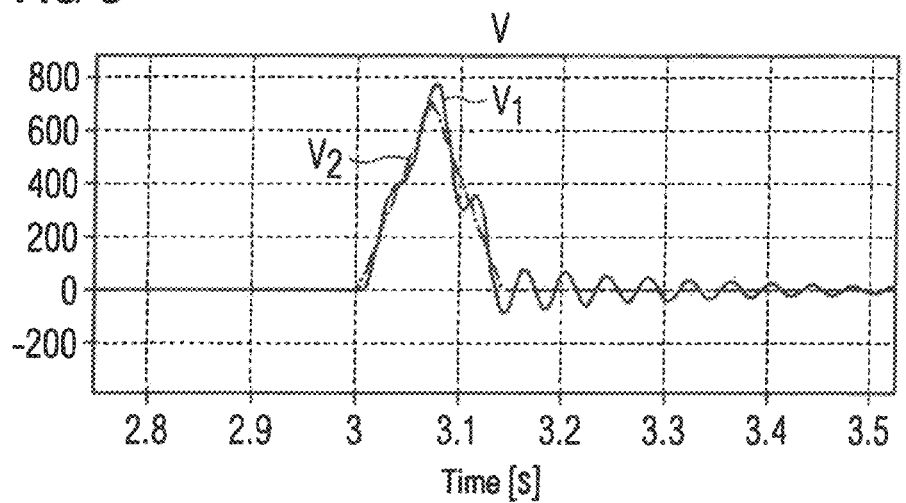

VIBRATION DAMPING SYSTEM AND MACHINE TOOL

CROSS-REFERENCES TO RELATED APPLICATIONS

This application claims the priority of European Patent Application, Serial No. 20182022.2, filed Jun. 24, 2020, pursuant to 35 U.S.C. 119(a)-(d), the disclosure of which is incorporated herein by reference in its entirety as if fully set forth herein.

BACKGROUND OF THE INVENTION

The present invention relates to a machine tool and a vibration damping system.

It would be desirable and advantageous to provide an improved machine tool and improved vibration damping system for a machine tool to obviate prior art shortcomings.

SUMMARY OF THE INVENTION

According to one aspect of the invention, a machine tool includes a machine element, an active vibration damper arranged on a region of the machine tool for damping a vibration of the machine element, and a vibration sensor facility arranged to detect the vibration of the machine element at a first point and at a second point of the machine tool, with the vibration of the machine element to be detected being smaller at the second point than at the first point, wherein the active vibration damper is designed to damp the vibration of the machine element as a function of a variation between a first actual value detected by the vibration sensor facility at the first point and a second actual value detected by the vibration sensor facility at the second point.

An active vibration damper can include an actively controlled element, by way of which a force effect can be exerted directly onto the corresponding machine element. During operation of the machine tool, the correspondingly active vibration damper is also actively controlled.

According to another advantageous feature of the invention, the active vibration damper and the vibration sensor facility can form a self-sufficient vibration damping system (not connected to a machine tool controller).

According to another advantageous feature of the invention, the machine element can be moved in a position-controlled manner in at least one direction. The vibration can comprise a number of vibration modes. The vibration modes can be two-dimensional or/and a torsion. The direction in which the machine element can be moved can be orthogonal to the plane of the two-dimensional vibration modes, for instance.

The vibration damper can be designed for instance to damp a vibration occurring during, e.g. machining of a workpiece by a tool in the machine element, and is arranged where the vibration is to be damped, e.g. on the Tool Center Point (TCP) or at another point in the machine tool, at which the vibration has developed, i.e. can be detected, and may have an amplitude which is approximately equal to the maximum amplitude of the vibration mode.

The second point may differ from the first point. The second point can be selected so that the vibration to be detected at the second point can only be smaller than the vibration to be detected at the first point. In particular, the vibration cannot be measured at the second point, i.e. the detectable vibration equates to zero.

The vibration at the first point may advantageously be approximately of same magnitude as the vibration in the region in which the vibration damper is arranged.

A machine tool in accordance with the invention enables a damping of low inherent frequencies and may therefore be embodied such that during smoothing a greater jerk into the drives of the machine axles, e.g. a jerk between approx. 15 m/s$^3$ and approx. 40 m/s$^3$, in particular a jerk of approx. 30 m/s$^3$, can be traveled. This allows productivity to be increased.

A machine tool in accordance with the invention can be embodied, e.g., as a milling machine, a rotary machine or a laser processing machine.

According to another advantageous feature of the invention, the vibration sensor facility can include a first vibration sensor arranged at the first point, e.g. mounted/attached, and a second vibration sensor arranged at the second point.

According to another advantageous feature of the invention, the first point can be located hi the region of the machine tool, and the first vibration sensor and the active vibration damper can be embodied as a structural unit.

According to another advantageous feature of the invention, the first point can be a loop and/or the second point can be a vibration node.

According to another advantageous feature of the invention, the machine element can include a processing head in the region.

According to another advantageous feature of the invention, the machine element can include a support arm having an end to define the region, with the processing head being arranged on the end of the support arm.

According to another advantageous feature of the invention, the machine element can be configured for movement in a first direction, with the vibration capable of running in a second direction, wherein the first direction is orthogonal to the second direction.

According to another advantageous feature of the invention, the active vibration damper can include a regulation unit, which can be designed to calculate the variation and to control the active vibration damper in accordance with the calculated variation.

According to another advantageous feature of the invention, the machine element can include the first point, the second point, and the region.

According to another aspect of the invention, a vibration damping system for a machine tool includes an active vibration damper designed to damp a vibration on a region of a machine element of the machine tool, and a vibration sensor facility designed to detect the vibration of the machine element at a first point and at a second point of the machine element, wherein the active vibration damper is designed to damp the vibration of the machine element as a function of a variation between a first actual value detected by the vibration sensor facility at the first point and a second actual value detected by the vibration sensor facility at the second point.

The vibration can only be developed and, e.g., be visible at the TCP. This vibration can also be developed at other points or parts of the machine tool and can be visible for instance. The active vibration damper is arranged at a region at which the vibration has developed. The vibration sensor facility measures the vibration at at least two points of the machine tool, wherein the vibration is developed at the first point and is not or is barely developed at the second point. The first point can, as already mentioned, lie in the region in which the vibration damper is attached. The vibration damper and the vibration sensor facility can (but need not)

both be arranged on the same machine element. For instance, the active vibration damper can be attached on the workpiece side, i.e. to a machine element on the workpiece side.

In summary, it is not only an actual value from that point in the machine tool at which the damping of the vibration of the (movable) machine element is to be reached that is fed to a vibration damping system according to the invention, but instead also an actual value from a point of the machine tool where the vibration of the (movable) machine element is not or is only marginally visible, e.g. from a vibration node.

A vibration damping system according to the invention is therefore self-sufficient and is not dependent on an item of information of the CNC controller or a regulation algorithm, which supplies the drives of the machine tool with position target values or regulates these in order to move the machine elements, i.e. there is no need to connect the vibration damping system to a CNC controller.

Integration and calculation of the sensor signals can be realized locally in the control/regulation device of the active vibration damper, without requiring an interface to the CNC controller. This means that the damping system can also always be active by the controller without information relating to the desired target movement, since the target values, represented by the signal from the first vibration sensor, are determined by measurement at a suitable point. The active vibration damping system can therefore always act self-sufficiently by the controller used on the machine, regardless of which process the machine is currently carrying out (smoothing, roughing etc.).

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 3 shows speeds measured by two vibration sensors.

DETAILED DESCRIPTION OF PREFERRED EMBODIMENTS

Figure 1:
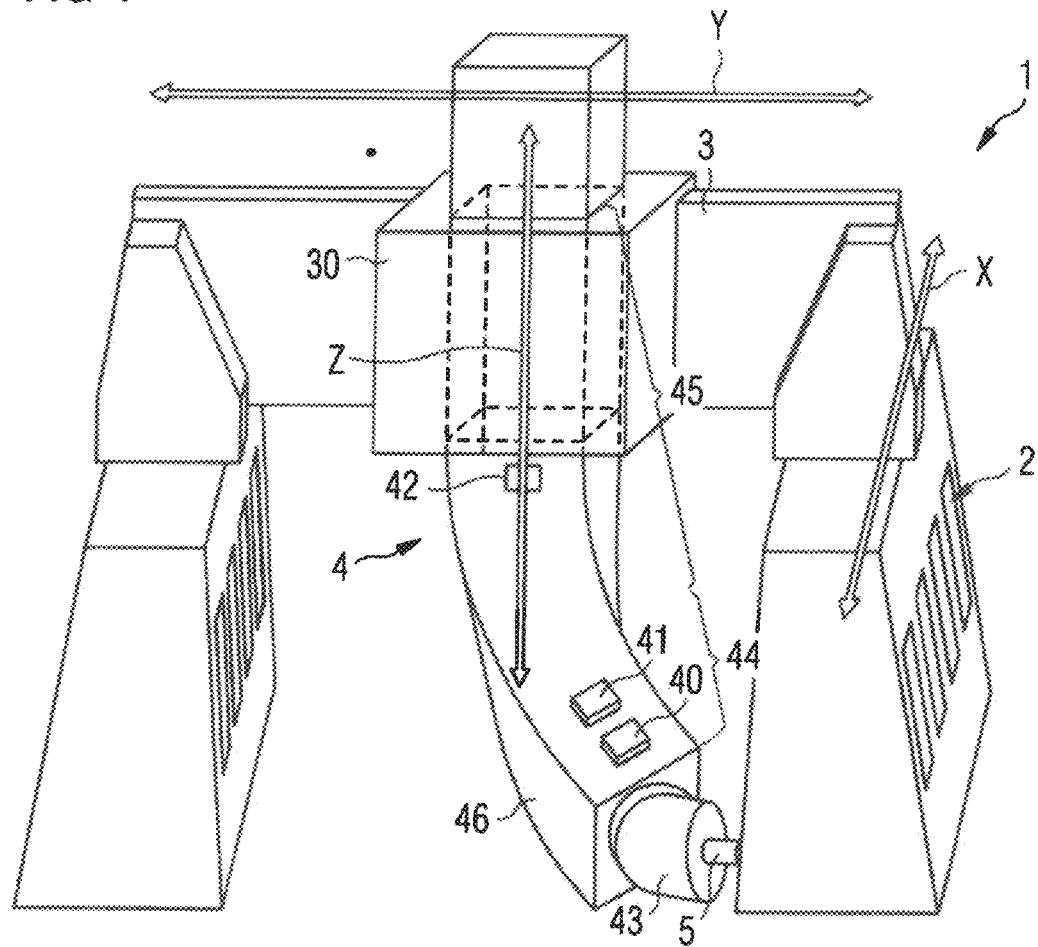
FIG. 1 is a schematic illustration of a machine tool according to the invention, embodied by way of example as a milling machine.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments may be illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a schematic illustration of a machine tool according to the invention, embodied by way of example as a milling machine, generally designated by reference numeral 1. The milling machine 1 includes a projecting machine element 4, which is supported by a sliding carriage 30. The projecting machine element 4 can be moved in the sliding carriage 30 in a position-controlled manner in at least one vertical direction Z by a drive, not shown here. The sliding carriage 30 is arranged on a portal of the milling machine 1. The portal includes a stationary machine element 2 and a movable bridge element 3. The sliding carriage 30 can be moved in a position-controlled manner in at least one direction Y—a longitudinal direction of the bridge element 3—by means of a drive, not shown here. The bridge element 3 can be moved in a position-controlled manner in at least one direction X—a longitudinal direction of the stationary machine element 2—by means of a drive, not shown here.

The projecting machine element 4 has a support arm, which can be embodied e.g. as a quadratic ram 46 in cross section, and a processing head 43 with a processing tool 5 fastened therein. The projecting machine element 4 has a first region 44 and a second region 45. The processing head 43 is arranged in the first region 44 of the projecting machine element 4. The regions 44, 45 differ from one another and relate, advantageously, to different longitudinal sections of the projecting machine element 4.

Vibrations develop during operation of the milling machine 1, for instance while the movable machine elements 3, 30, 4 are moved or while a workpiece, not shown here, is processed with the processing tool 5.

The vibrations can comprise one or more vibration modes, which are developed, e.g. visible, at a Tool Center Point, i.e. in most cases at a processing end of the processing tool 5. Such vibration modes can be unwanted, because they can have a negative impact on productivity, e.g. caused by increased tool wear and/or quality as a result of inaccurate processing of the workpiece and/or they are responsible for an excessively high noise level. This can involve transversal vibration modes, for instance.

The vibrations modes are not only developed at the Tool Center Point. They can be detected at one (or more) machine element(s) 2, 3, 30, 4. The vibration modes can have two or more loops and/or vibration nodes.

A vibration damping system is provided in order to damp the at least one (unwanted) vibration mode. The vibration damping system includes at least an active vibration damper 40 and a vibration sensor facility. The vibration sensor facility shown in FIG. 1 has a first vibration sensor 41 and a second vibration sensor 42.

The vibration damper 40 is mounted in the first region 44 of the projecting machine element 4. FIG. 1 shows assembly of the vibration damper 40 on the ram 46. Assembly of the vibration damper 40 on the processing head 43 is likewise conceivable. Furthermore, assembly of the vibration damper 40 on another machine element, e.g. on the sliding carriage 30, on the bridge element 3, or on the portal, is possible, provided the vibration mode has developed there and can therefore be effectively damped.

The first vibration sensor 41 is arranged at a first point which is located in the first region 44. It is conceivable that the first vibration sensor 41 is attached in the or on the vibration damper 40. The second vibration sensor 42 is arranged at a first point which is located within the second region 45.

The active vibration damper 40 is embodied to damp a vibration mode which is bothersome at the Tool Center Point, for instance. The first vibration sensor 41 is designed to detect this vibration mode in the first region 44, whereas the second vibration sensor 42 is designed to detect the vibration mode in the second region 45. The first vibration sensor 41 can be arranged at another point in the milling machine 1, at which the vibration is developed, e.g. at the sliding carriage 30, at the bridge element 3 or at the portal. The second point, to which the second vibration sensor is attached, vibrates less than the first point. The vibration at the second point is advantageously barely measurable, in particular equates to zero.

Figure 2:
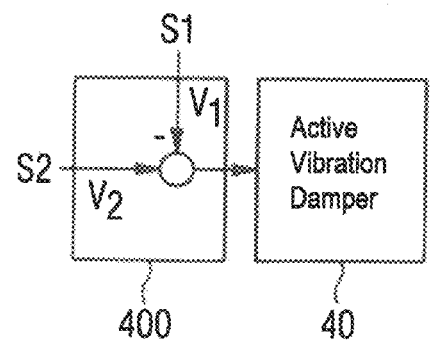
FIG. 2 shows input signal of a vibration carrier.

The vibration sensors 41, 42 can detect, e.g. corresponding speeds or accelerations (see FIG. 3), and send these, as shown in FIG. 2, in the form of signals S1, S2 to a regulation unit 400, with which the vibration damper 40 is equipped. The regulation unit 400 is designed to calculate a variation between the signals S1 and S2 and to control the active vibration damper 40 in accordance with the calculated variation (see FIG. 2).

FIG. 1 does not show the regulation unit 400. The regulation unit 400 can be arranged, e.g. in a control cabinet outside of the milling machine 1 and connected to the active vibration damper 40 via a cable.

The active vibration damper 40 is therefore designed to damp the vibration mode as a function of the variation between a signal S1 (first actual value of the vibration mode) detected by the first vibration sensor 41 in the first region 44 and a second signal S2 (second actual value of the vibration mode) detected by the second vibration sensor 42 in the second region 44.

The second point is selected such that the vibration mode is less developed there than at the first point. This is illustrated by FIG. 1, which shows an excessively large deflection of the projecting machine element 4. The vibration detected by the second vibration sensor 42 can therefore be used as a target value for the active vibration damper 40. In this case, the damping system is self-sufficient and need not be connected to a control unit, e.g. CNC controller, which would calculate target values for the controller of the active vibration damper 40.

The second region 45 advantageously includes a vibration node of the vibration mode. In this case it may be advantageous to arrange the second vibration sensor 42 at the vibration node.

The active vibration damper 40 can be supplied with a power cable, for instance. In its interior, the active vibration damper 40 can include a linear motor and a sensor designed to commutate the built-in linear motor. A sensor cable can be guided into the control cabinet like the power cable. The afore-described regulation of the active vibration damper 40 can be implemented in the control cabinet.

The first vibration sensor 41 and the active vibration damper 40 are embodied as separate structural units. The first vibration sensor 41 can also be arranged in the active vibration damper 40, however.

In summary, FIG. 1 illustrates that the first vibration sensor 41 "sees" the vibration to be damped, wherein the second vibration sensor 42, advantageously arranged in a vibration node, does not see or barely sees the vibration. The second vibration sensor 42 therefore represents the aspired target value for the measuring point, to which the first vibration sensor 41 is attached. FIG. 2 shows how the measured signals can be calculated in the regulation of the active vibration damper 40, with signal S2 being the target value and signal S1 being the control variable. The measuring signal can be a speed or an acceleration. The variation between the two vibration sensors 40, 41 is therefore regulated. The target value is hereby automatically taken into account. FIG. 3 shows by way of example the course of speeds, which are measured at the second vibration sensor 42 and at the first vibration sensor 41. The vibration is advantageously only identified on the signal S1 as in FIG. 3, and the signal S2 corresponds to the speed target value.

The vibration mode described previously can be two or also three-dimensional.

The vibration modes to be observed in conjunction with the invention or to be damped are currently preferred to have a low frequency, for instance less than approx. 100 Hz, in particular between approx. 50 Hz and approx. 70 Hz.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated. For instance, the invention can also find application in other types of machine tools (laser cutting, 3D printing robots).

What is claimed as new and desired to be protected by Letters Patent is set forth in the appended claims and includes equivalents of the elements recited therein:

What is claimed is:

1. A machine tool, comprising:
   a machine element;
   an active vibration damper arranged on a region of the machine tool for damping a vibration of the machine element; and
   a vibration sensor facility arranged to detect the vibration of the machine element at a first point and at a second point of the machine tool, with the vibration of the machine element to be detected being smaller at the second point than at the first point and the first point is a loop and/or the second point is a vibration node,
   wherein the active vibration damper is designed to damp the vibration of the machine element as a function of a variation between a first actual value detected by the vibration sensor facility at the first point and a second actual value detected by the vibration sensor facility at the second point.

2. The machine tool of claim 1, wherein the vibration sensor facility comprises a first vibration sensor arranged at the first point, and a second vibration sensor arranged at the second point.

3. The machine tool of claim 1, wherein the first point is located in the region of the machine tool, said first vibration sensor and the active vibration damper being embodied as a structural unit.

4. The machine tool of claim 1, wherein the machine element comprises a processing head in the region.

5. The machine tool of claim 4, wherein the machine element comprises a support arm having an end to define the region, said processing head being arranged on the end of the support arm.

6. The machine tool of claim 1, wherein the machine element is configured for movement in a first direction, with the vibration capable of running in a second direction, wherein the first direction is orthogonal to the second direction.

7. The machine tool of claim 1, wherein the active vibration damper comprises a regulation unit, which is designed to calculate the variation and to control the active vibration damper in accordance with the calculated variation.

8. The machine tool of claim 1, wherein the machine element includes the first point, the second point, and the region.

9. A vibration damping system for a machine tool, said vibration damping system comprising:

an active vibration damper embodied to damp a vibration on a region of a machine element of the machine tool; and a vibration sensor facility designed to detect the vibration of the machine element at a first point and at a second point of the machine element and the first point is a loop and/or the second point is a vibration node, wherein the active vibration damper is designed to damp the vibration of the machine element as a function of a variation between a first actual value detected by the vibration sensor facility at the first point and a second actual value detected by the vibration sensor facility at the second point.

10. The vibration damping system of claim 9, wherein the vibration sensor facility comprises a first vibration sensor arranged at the first point, and a second vibration sensor arranged at the second point.

11. The vibration damping system of claim 9, wherein the first point is located in the region of the machine element, said first vibration sensor and the active vibration damper being embodied as a structural unit.

12. The vibration damping system of claim 9, wherein the active vibration damper comprises a regulation unit, which is designed to calculate the variation and to control the active vibration damper in accordance with the calculated variation.

13. The vibration damping system of claim 9, wherein the active vibration damper and the first vibration sensor are arranged in a first region of the machine element and the second vibration sensor is arranged in a second region of the machine element.

14. The vibration damping system of claim 13, wherein the first region of the machine element and the second region of the machine element differ from one another and relate to different longitudinal sections of the machine element.

15. A vibration damping system for a machine tool, said vibration damping system comprising:

an active vibration damper embodied to damp a vibration on a region of a machine element of the machine tool; and a vibration sensor facility designed to detect the vibration of the machine element at a first point and at a second point of the machine element, wherein the vibration sensor facility comprises a first vibration sensor arranged at the first point, and a second vibration sensor arranged at the second point, and wherein the active vibration damper is designed to damp the vibration of the machine element as a function of a variation between a first actual value detected by the vibration sensor facility at the first point and a second actual value detected by the vibration sensor facility at the second point.

16. The vibration damping system of claim 15, wherein the active vibration damper and the first vibration sensor are arranged in a first region of the machine element and the second vibration sensor is arranged in a second region of the machine element.

17. The vibration damping system of claim 16, wherein the first region of the machine element and the second region of the machine element differ from one another and relate to different longitudinal sections of the machine element.

* * * * *